US011582892B2

(12) United States Patent
Jafar Abboud

(10) Patent No.: US 11,582,892 B2
(45) Date of Patent: Feb. 21, 2023

(54) FORMATIONS TO PLOW THE SURFACE LAND USING MODULAR AGRICULTURAL DRAW IMPLEMENT AND THEIR COMPONENTS

(71) Applicant: Nury Jafar Abboud, Andira (BR)

(72) Inventor: Nury Jafar Abboud, Andira (BR)

(*) Notice: Subject to any disclaimer, the term of this patent is extended or adjusted under 35 U.S.C. 154(b) by 66 days.

(21) Appl. No.: 16/992,340

(22) Filed: Aug. 13, 2020

(65) Prior Publication Data

US 2021/0168987 A1 Jun. 10, 2021

(51) Int. Cl.
| | |
|---|---|
| *A01B 15/02* | (2006.01) |
| *A01B 15/14* | (2006.01) |
| *A01B 5/04* | (2006.01) |
| *A01B 21/04* | (2006.01) |
| *A01B 23/04* | (2006.01) |

(52) U.S. Cl.
CPC ............... *A01B 15/02* (2013.01); *A01B 5/04* (2013.01); *A01B 15/14* (2013.01); *A01B 21/04* (2013.01); *A01B 23/046* (2013.01)

(58) Field of Classification Search
CPC ......... A01B 23/00; A01B 23/02; A01B 23/04; A01B 23/046; A01B 21/08; A01B 35/00
See application file for complete search history.

(56) References Cited

U.S. PATENT DOCUMENTS

| | | | | | |
|---|---|---|---|---|---|
| 353,001 | A | * | 11/1886 | Pile ........................ | A01B 19/02 172/656 |
| 414,047 | A | * | 10/1889 | Hughes .................. | A01B 19/02 172/653 |
| 479,476 | A | * | 7/1892 | Teschner et al. ...... | A01B 19/02 172/632 |
| 488,943 | A | * | 12/1892 | La Dow ................. | A01B 21/04 172/591 |
| 501,886 | A | * | 7/1893 | La Dow ................. | A01B 19/02 172/627 |
| 531,308 | A | * | 12/1894 | Evans .................... | A01B 19/04 172/627 |
| 544,837 | A | * | 8/1895 | Archer et al. ......... | A01B 21/04 172/594 |
| 610,073 | A | * | 8/1898 | Motherwell .......... | A01B 19/02 172/369 |
| 644,111 | A | * | 2/1900 | Taylor ................... | A01B 19/02 172/653 |
| 690,328 | A | * | 12/1901 | Smith .................... | A01B 19/02 172/648 |

(Continued)

*Primary Examiner* — Jessica H Lutz
(74) *Attorney, Agent, or Firm* — Defillo & Associates, Inc; Evelyn A. Defillo

(57) ABSTRACT

Formations to plow the surface layer of a land using modular agricultural implement of drag and respective components. It was developed to attend specific agricultural activities in areas of compatible dimensions and to carry out the overturning of the superficial layer of the soil, leveling, and/or incorporating correctives and fertilizers, as well as reducing compaction to increase porous spaces and increase the permeability and storage of air and water. It is assembled in modules under different forms of assembly, highlighting there are the triangular agricultural formation in three versions, triangle forward, triangle backward, and agricultural formation large triangle, and the agricultural formation in rhombus in two versions, the simple rhombus, and the large rhombus.

4 Claims, 5 Drawing Sheets

(56) References Cited

U.S. PATENT DOCUMENTS

| | | | | | |
|---|---|---|---|---|---|
| 832,325 | A | * | 10/1906 | Kiner | A01B 19/04 172/627 |
| 1,033,620 | A | * | 7/1912 | Ross | A01B 21/08 172/548 |
| 1,392,900 | A | * | 10/1921 | Ambrose | A01B 31/00 56/8 |
| 1,402,586 | A | * | 1/1922 | Erwin | A01B 31/00 172/554 |
| 1,415,825 | A | * | 5/1922 | Ferrell | A01B 19/02 172/633 |
| 1,499,143 | A | * | 6/1924 | Barnard | A01B 19/04 172/632 |
| 1,532,986 | A | * | 4/1925 | Branson | A01B 21/00 172/551 |
| 1,535,050 | A | * | 4/1925 | Silva | A01B 19/02 172/651 |
| 1,624,421 | A | * | 4/1927 | Meyer | E01C 23/082 172/684.5 |
| 1,727,253 | A | * | 9/1929 | Severance | A01B 31/00 172/612 |
| 1,897,820 | A | * | 2/1933 | Pitchford | B27B 33/145 56/8 |
| 2,751,736 | A | * | 6/1956 | Hessemer | A01B 29/045 144/34.1 |
| 3,415,541 | A | * | 12/1968 | Thiessen | A01B 59/042 280/413 |
| 5,355,963 | A | * | 10/1994 | Boyko | A01B 21/04 172/383 |
| 5,794,712 | A | * | 8/1998 | Phillips | A01B 73/044 172/612 |
| 10,405,472 | B2 | * | 9/2019 | Ainge | A01B 23/06 |

\* cited by examiner

Detail A

Detail B

Detail A

Detail B

Detail C
H &

Detail D

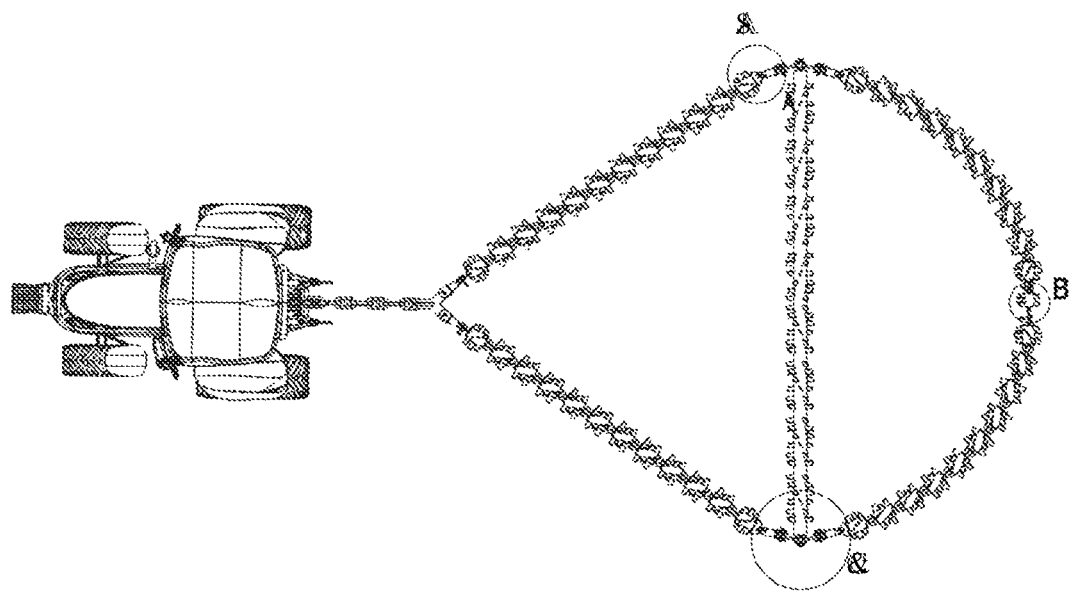
FIG. 10
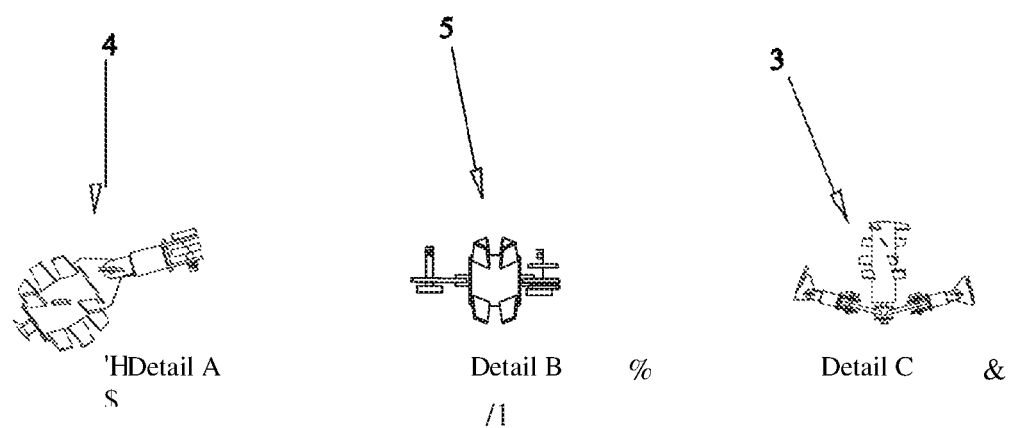
Detail A
Detail B
Detail C

FORMATIONS TO PLOW THE SURFACE LAND USING MODULAR AGRICULTURAL DRAW IMPLEMENT AND THEIR COMPONENTS

INTRODUCTION

The present Utility Model patent descriptive report concerns Formations to Plow the Surface Layer of Land Using Trailed Agricultural Modular Implement and Its Components, hereinafter called Agricultural Formation, which was developed to meet specific agricultural activities in areas of compatible dimensions, it is necessary to revolve the surface layer of the soil, leveling and/or incorporating correctives and fertilizers, as well as reducing compaction to increase porous spaces and increase air and water permeability and storage.

In this way and to meet the intended purposes, the Agricultural Formation consists of cylinders equipped with knives, swivels, couplings and a central axis equipped with knives, highlighting that the set formed by all these components is fixed on the couplings of two tractors, one on each side, which will pull the Agricultural Formation previously determined in accordance with each area.

Each Agricultural Formation, as stated above, is pulled by two tractors, one on each side of the Formation and are defined according to planning according to the size of the area and the type of culture, being the forms of assembly, Triangular in three versions and Rhombus in two versions, all using central axis.

FIELD OF THE APPLICATION

The field of application of this Agricultural Formation is in the field of agriculture, both in farming and in livestock, mainly in large areas, aiming to attend specific agricultural activities when carrying out the revolving of the superficial layer of the soil, leveling and/or incorporating correctives and fertilizers.

Purpose

Among the main purposes of this Agricultural Formation, the pasture reforms stand out, removal of plants that cause shading in the pasture without eradicating the original pasture already consolidated. crops and incorporating fertilizers and other fertilizers by turning the topsoil, with very high productivity depending on the size of each agricultural formation.

Problems to be Solved

As common knowledge among technicians in the field, today there are several plows or trailing harrows, known as agricultural harrows or plower harrows, which are formed by sprockets attached to small, medium or large metal structures. Usually this type of agricultural implement is equipped with one or two axes provided with different quantities of discs or harrows, a characteristic that determines the type of equipment that will carry out the pulling, that is, small, medium or large tractor.

The problems that happen with the equipment above, do not refer to the way of plowing, but to the number of plows that can be pulled by a tractor. Normally, a tractor can pull a plow harrow formed by the support structure and two sets of plow harrows, and in contrast, the Agricultural Implement now presented allows coupling several cylinders, forming patrols that integrate a formation, among which we mention the use of 45 cylinders, considerably increasing the area to be plowed with the consequent increase in productivity.

The author of this document, filed in 2009 and 2014, patent applications in relation to the topic, which offered technical solutions for large areas, noting that the aforementioned documents were subject to technical improvements developed from technical and operational observations harvested in the field, which considerably increase the useful life of the components, as well as granting extremely high productivity.

State of the Technique

Due to the elements known in the State of the Art and aiming at placing a product coated with its own characteristics on the market, a search was carried out in the INPI database—National Institute of Industrial Property and the following documents were found in them:

PI0902367-4 deposited on Jul. 8, 2009 and published Aug. 23, 2014 under the title "TRAIL AGRICULTURAL IMPLEMENT", it is a equipment to be used in the preparation of land for planting, where two tractors will drag the equipment (FIG. 05) specially constituted by rotating cylinders (FIGS. 01 and 02), which will cause the organic material to reincorporate into the soil, at the same time leveling the ground and preparing it for the sowing that will take place immediately, taking advantage of the moisture still contained in the soil to improve the germination condition of the seeds.

BR 20 2014 024289-4 deposited on Sep. 29, 2014 and published on Oct. 11, 2016 under the title "TRAIL AGRICULTURAL IMPLEMENT", this Utility Model refers to an agricultural drag implement that is constituted by metallic cylinders (7) with rods that have a cutting angle, usually distributed in the form of a thread, in order to puncture like small hoes that plow the earth and distribute the turned material in such a way as to obtain the leveling of the soil and the lodging of vegetation used as cover; The cylinders (7) are joined to each other through their tension-resistant handles, and joined to the chains of 6 rods (5) and 4 rods (4) by connectors and pins, locked by screws and nuts; Containing in the center of the composition, and according to its size, between sections. spaced swivels with rods (8). Once the composition is set, both sides are joined by common chains that contain at their ends a coupling with bearings (1 2), which allows the coupling to the two tractors that will pull the implement (FIG. 01).

Technological Progress

The productivity obtained, as well as the operational speed developed by the Agricultural Formation, corresponds to the fact that it is assembled in modules according to the work to be carried out and also with the size of the area to be plowed or treated.

The Agricultural Formation is characterized by being presented in different forms of assembly, highlighting the Triangular Agricultural Formation in three versions, Triangle forward and Triangle backwards; and the Agricultural Formation Large Triangle, and finally the Agricultural Formation Rhombus in two versions, Simple Rhombus and Large Rhombus.

The Triangle Forward Formation, as its name says, has a triangle shape and the tip of the triangle is attached to the tractor's tail.

The Triangle Backwards Formation is characterized because the central axis of the equipment is coupled to the tail of the tractor and the cylinders work behind the axis, forming a triangle behind the rear axis.

In the Large Triangle Formation, the equipment can be connected to other equipment forming a larger triangle by folding the work area. equipment, keeping them together throughout the field work.

The Simple Rhombus Formation uses the cylinders and a central rotating axis, according to its name, has the shape of a rhombus and is coupled to the tractor that maintains this geometric shape during the development of this particular service.

In the Large Rhombus Formation, the equipment is set with the central axis, maintaining the shape of a rhombus and with a crosspiece that supports the two ends of the rhombus forming a cross, thus the support of the equipment will be in 4 points of the rhombus.

Regarding the components used in Agricultural Formation, they are the cylinders, swivels, couplings and central axis.

In this way, the cylinders, single or double, part of the set of components, correspond to the implements will make the opening of the grooves and make the overturning of the superficial layer of the soil, leveling and/or incorporating correctives and fertilizers since and according to development, having knives welded and positioned helically in two directions, "left and right" or "clockwise and counterclockwise".

The Swivels correspond to the components intended to ensure that the rotational movement of the cylinders is not hindered by piling up along the Agricultural Formation, and they are presented under different models, with the highlight being the swivel without bearings and with grease cap and the swivel with tapered bearings.

The Hitch corresponds to the connecting element between the tractor and the Agricultural Formation and is called the front hitch and equipped with bearings.

The Central Axis corresponds to the tubular structure equipped with trapezoidal knives, which, according to the chosen Agricultural Formation, is attached to the tail of the tractor either at the beginning of the curved part of the rhombus or forming a cross with the use of a crosspiece.

The use of components and respective technical improvements, as well as the use of work formations, provide a functional and operational improvement, mainly due to the fact that it is assembled in modules according to the work to be performed and also with the working angle of the knives of the equipment, which do not make a deep cut in the soil profile, nor do they destabilize its structure, which is the pursuit of no-till systems, in addition to having a much higher yield than the existing ones and a very minimal maintenance in this comparison.

DESCRIPTION OF THE FIGURES

For a total and complete visualization of how the implement is constituted, follow the accompanying illustrative drawings, to which references are made as follows:

FIG. 10: Illustrates top view of Agricultural Formation in Rhombus format which is mounted with the central axis maintaining this format, and the Details A/B/C which represent, respectively, the Swivel with tapered bearings; The Swivel with grease cap and the Swivel without bearings.

DESCRIPTION OF THE INVENTION

Figure 1:
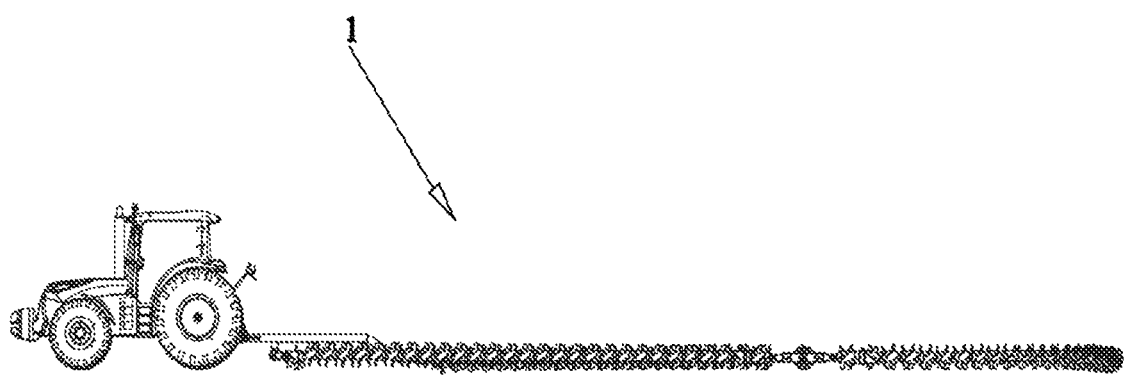
FIG. 1: It represents a side view of a tractor pulling an Agricultural Formation.
Figure 2:
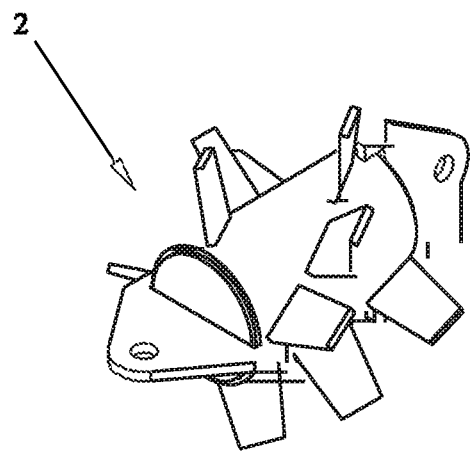
FIG. 2: Illustrates perspective view of a single hitch cylinder.
Figure 3:
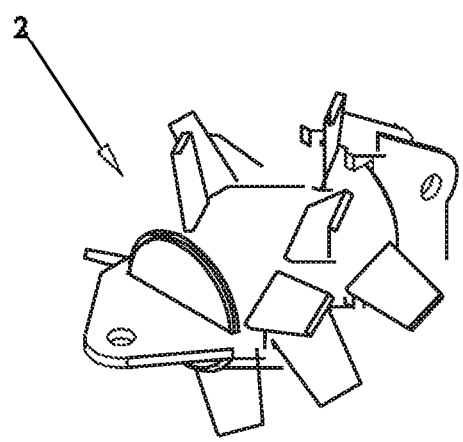
FIG. 3: Shows a perspective view of a double hitch cylinder.
Figure 4:
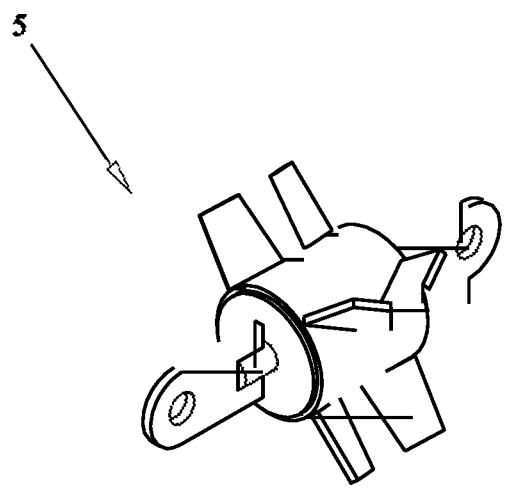
FIG. 4: Corresponds to the perspective view of a swivel without bearings and with a grease cap.
Figure 5:
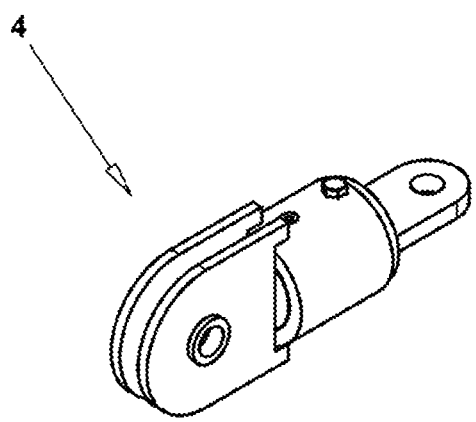
FIG. 5: Refers to the perspective view of a swivel with tapered bearings.
Figure 6:
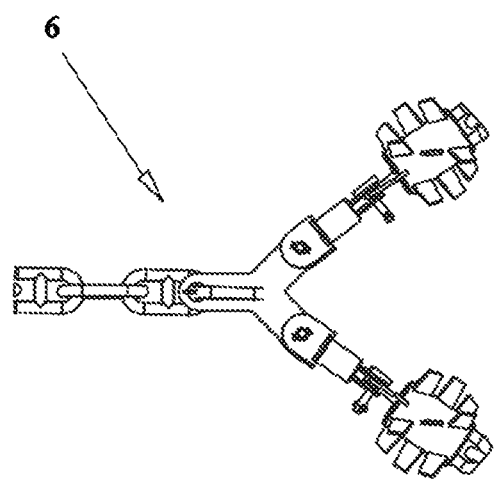
FIG. 6: Represents top view of the front hitch with bearings.
Figure 7:
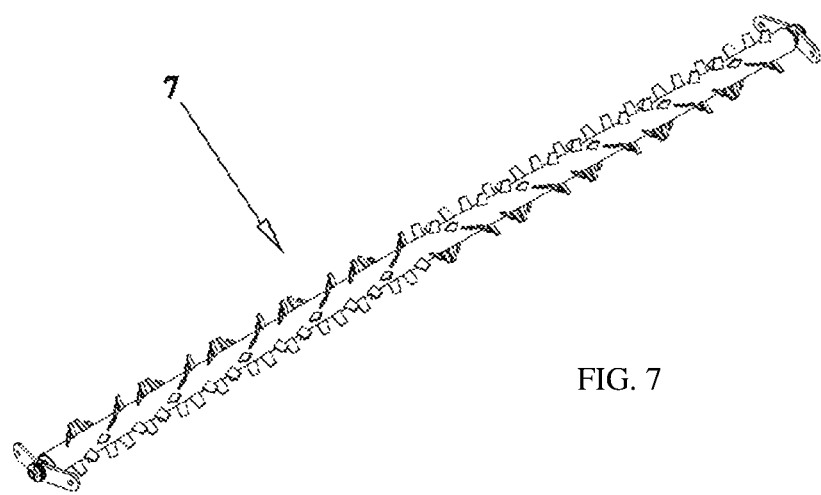
FIG. 7: Corresponds to the perspective view of the Central Axis.
Figure 8:
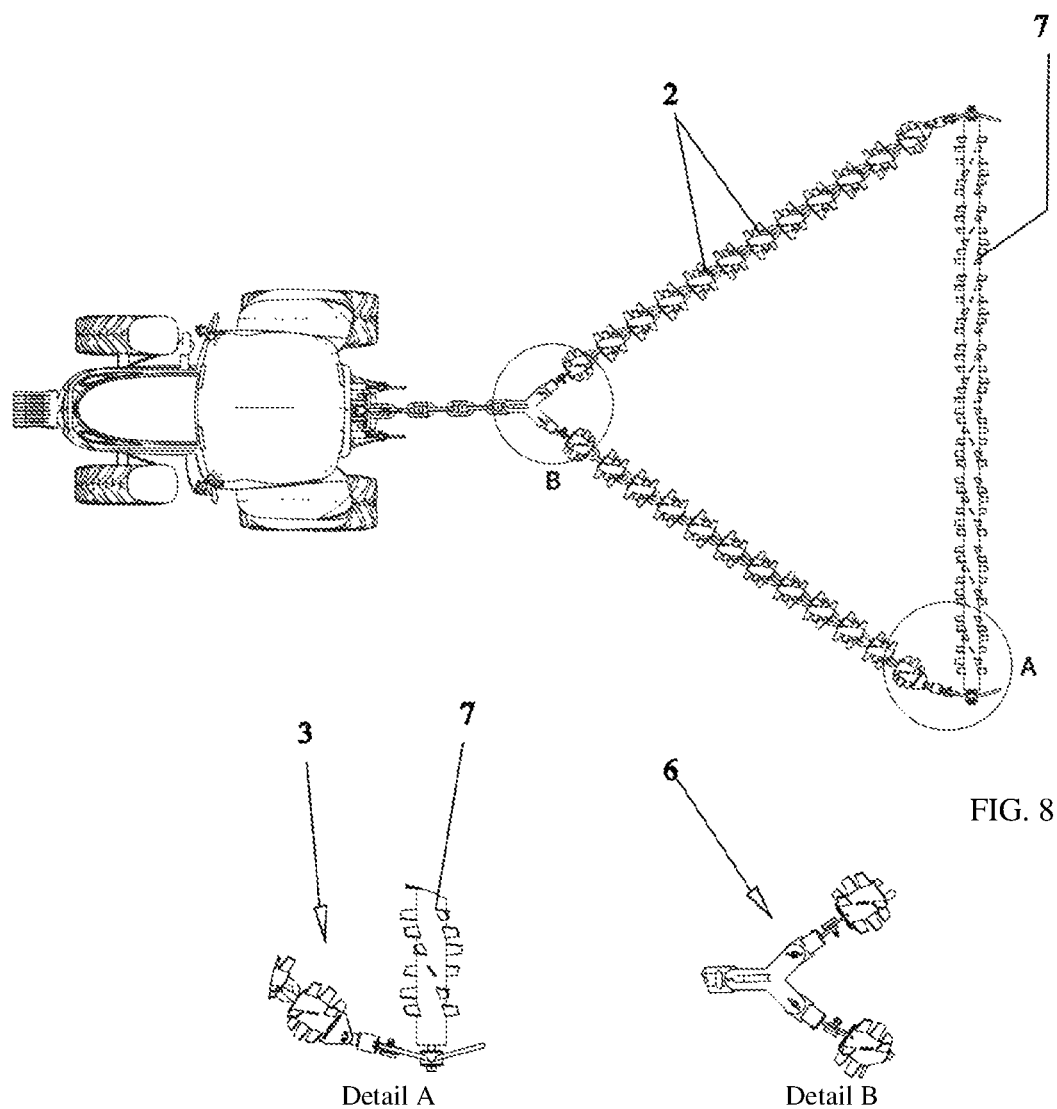
FIG. 8: It shows a top view of a modular assembly in a forward triangle, with the tip attached to the tractor tail Details A/B: They represent, respectively, the front hitch with bearings and the swivel without bearing for mounting this equipment in a triangle shape.
Figure 9:
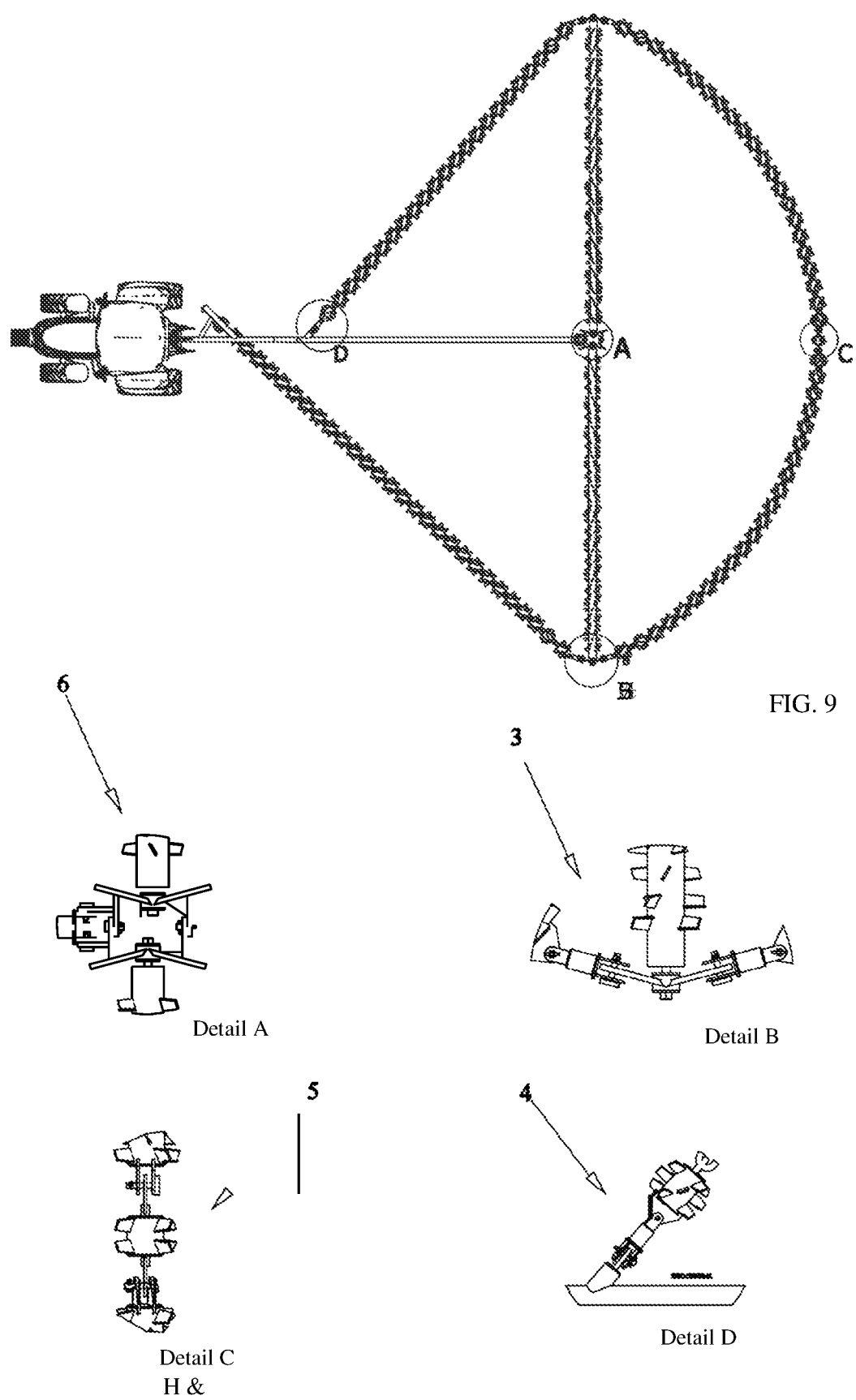
FIG. 9: It refers to the top view of the Agricultural Formation in Triangle backwards, where the central axis is coupled to the tail of the tractor and the cylinders work behind the axis, forming a triangle, with the following details: Detail A: Illustrates view of the double hitch; Detail B: Shows the Swivel without bearing, Detail IC represents the Swivel without bearing with grease cap, and Detail D corresponds to the side view of the Swivel with tapered bearings.

As can be inferred from the drawings that accompany and are an integral part of this report, the Agricultural Formation (1) was developed to meet specific agricultural activities in areas of compatible dimensions and to revolve the surface layer of the soil, leveling and/or incorporating correctives and fertilizers, as well as reducing compaction to increase porous spaces and increase air and water permeability and storage.

In this way and to meet the intended purposes, Agricultural Formation (1) consists of cylinders (2) equipped with knives, swivels without bearings (3) and swivels with tapered bearings (4) and swivels without bearings and with grease cap (5), couplings (6) and central axis (6) equipped with knives, noting that the set formed by all these components is fixed on the couplings (6) of two tractors, one on each side, which will pull the Agricultural Formation (1) previously determined in accordance with each area, since it is assembled in modules and works in six different forms, being produced by several cylinders (2) that connect to each other and around these cylinders trapezoidal-shaped knives are welded, following a helical sequence, from the center, two directions in helical form: 'Left and right' or clockwise and counterclockwise.

Because it is produced in cylinders (2) that connect, the implement can be assembled in various sizes ranging from 1 meter of working range to 15 meters of working range. The position of the knives around the cylinder can also be modified according to the type of work you are going to do. For this purpose, from the moment of manufacture, the knives can have a position aligned around the cylinder, with an inclination of 25 degrees and so changing the attack to the soil, in the aligned format, the knives can make a cut in the soil profile, producing a greater revolving.

The components correspond to single or double cylinders (2), three types of swivel (3) and (4) and (5), couplings (6) and central axis (7), highlighting that the cylinders (2), simple or doubles, part of the set of components, correspond to the implements that will make the opening of the grooves and make the overturning of the superficial layer of the soil, leveling and/or incorporating correctives and fertilizers, since and according to development, having knives welded and positioned in shape helical in two directions, "left and right" or "clockwise and counterclockwise".

In turn, the Swivels (3), (4) and (5) correspond to the components intended to ensure that the rotational movement of the cylinders is not hindered by windings along the Agricultural Formation (1), the same being presented under different models, including the swivel without bearings (3) and with grease cap (5) and the swivel with tapered bearings (4).

The Hitch (6) corresponds to the connecting element between the tractor and the Agricultural Formation (1) and is called the front hitch and equipped with bearings and the Central Axle (7) corresponds to the tubular structure equipped with trapezoidal knives, which is according to the Agricultural Formation (1) chosen, it is attached to the tail of the tractor or at the beginning of the curved part of the rhombus or forming a cross with the use of a crosspiece.

With the use of the components described above, the implement can be assembled in several formats which can have different geometric shapes, such as Triangular Agricultural Formation in three versions, Triangle Forward and Triangle Backwards finally the Agricultural Formation Large Triangle, and Agricultural Rhombus Formation in two versions, Simple Rhombus and Large Rhombus, The Forward Triangle Formation, as its name says, has a triangle shape and the tip of the triangle is attached to the tail if the tractor.

The Triangle Backwards Formation is characterized because the central axis (7) of the equipment is coupled to the tail of the tractor and the cylinders (2) work behind the axis, forming a triangle behind the posterior axis.

In the Large Triangle Formation, the equipment can be connected to other equipment forming a larger triangle by folding the work area. equipment, keeping them together throughout the field work.

The Simple Rhombus Formation uses the cylinders (2) and a central rotating axis, according to its name, has the shape of a rhombus and is coupled to the tractor that maintains this geometric shape during the development of this particular service.

In the Large Rhombus Formation, the equipment is set with the central axis, maintaining the shape of a rhombus and with a crosspiece that supports the two ends of the rhombus forming a cross, thus the support of the equipment will be in 4 points of the rhombus.

When in operation, all cylinders (2) are connected to each other and form a session of various sizes and these sessions are connected at the ends by swivels (3) (4) and (5) that allow all of these sessions to produce, in contact with the ground, rotation and impact movements.

The Agricultural Formation (1) is pulled by two tractors and can be assembled by joining the modules and forming a chain, each end of this chain is coupled to a tractor forming a parabola shape. The tractors work in parallel with each other and the space between them is processed by the cylinders with the knives making the soil turning.

When manufactured, each component is produced entirely in 1045 and 5160 carbon steel, all parts of the cylinder are welded with mig welding with weld stroke speed adjusted to maintain the quenching and strength of the steel. The knives have a trapezoidal shape with a base larger than the top, the pins that make the connection between one cylinder and another are forged to gain the curved shape to connect one cylinder to the other, making it possible to increase or decrease a session and, with this, regulate the cutting action of the knives. Another option of coupling between the cylinders (2) is welding on the ends of the cylinder's plates with double and simple eye that connect using a pin and against pin.

CONCLUSION

It is verified by everything that has been described and illustrated that it is about Formations to Plow the Surface Layer of Land Using the Agricultural Modular Implement of Drag and Respective Components, (1), which fits perfectly within the rules that govern the patent of Utility Model, which should fill an important gap in the market, deserving for what was exposed and as a consequence, the respective privilege.

The invention claimed is:

1. A modular agricultural trail device to plow a land surface comprising:
    at least one module including an agricultural formation adapted to be connected to a tractor tail, each one of the agricultural formations have a triangle shape and includes:
    a first set of cylinders forming a first side of the triangle;
    a second set of cylinders forming a second side of the triangle;
    a central rotating tubular structure forming a base of the triangle, the first set of cylinders having a first end connected to a first end of the central rotating tubular structure, the second set of cylinders having a first end connected to a second end of the central rotating tubular structure;
    a plurality of knives located through the central rotating tubular structure,
    wherein the first set of cylinders and the second set of cylinders includes at least one of:
    swivels without bearings;
    swivels with tapered bearings; or
    swivels without bearings and with a grease cap;
    couplings to connect the at least one module to the tractor trail.

2. The modular agricultural trail device according to claim 1, wherein each one of the agricultural formation includes:
    a trinagle forward formation in which a second end of the first set of cylinders and a second end of the second set of cylinders are connected to a hitch that is connected to the tractor tail;
    a triangle backwards formation in which the central rotating tubular structure is connected to the tractor trail and the first set and the second set of cylinders are placed behind the central rotating tubular structure forming a triangle; or
    a large triangle formation having;
        a first agricultural formation in which a second end of the first set of cylinders and a second end of the second set of cylinders are located on a first side of the central rotating tubular structure and are connected to a hitch that is connected to the tractor tail; and
        a second agricultural formation connected to the central rotating tubular structure and is located on a second side of the central rotating tubular structure connected to a hitch located on the tractor tail and a second agricultural formation.

3. The modular agricultural trail device according to claim 2, wherein the large triangle formation has a shape of:
    a small rhombus; and
    a large rhombus.

4. The modular agricultural trail device according to claim 1, wherein the knives have a trapezoidal shape with a base larger than a top.

\* \* \* \* \*